United States Patent

[11] 3,583,722

| [72] | Inventor | Isidor R. Jacobson<br>424 3rd Ave. South Apt. 217, Edmonds, Wash. 98020 |
|------|----------|---------------------------------------------------------------------|
| [21] | Appl. No. | 824,886 |
| [22] | Filed | May 15, 1969 |
| [45] | Patented | June 8, 1971 |

[54] COLLAPSIBLE BOBSLED
9 Claims, 11 Drawing Figs.

[52] U.S. Cl. .................................................. 280/16,
280/20, 280/27, 280/28
[51] Int. Cl. .............................................. B62b 13/16
[50] Field of Search ........................................ 280/12, 15,
16, 17, 20, 21, 27, 28; 9/310

[56] References Cited
UNITED STATES PATENTS

| 630,810 | 8/1899 | Kidder............................ | 280/28 |
| 2,152,013 | 3/1939 | Anderson....................... | 280/15 |
| 2,472,920 | 6/1949 | Peenstra........................ | 280/20 |
| 2,523,052 | 9/1950 | Normandin.................... | 280/28 |
| 2,824,746 | 2/1958 | Schummer..................... | 280/28 |
| 2,978,251 | 4/1961 | Gerdes........................... | 280/28X |
| 3,307,209 | 3/1967 | Jackman........................ | 9/310 |
| 3,372,944 | 3/1968 | Lauritzen...................... | 280/20X |

*Primary Examiner*—Kenneth H. Betts
*Assistant Examiner*—Leslie J. Paperner
*Attorney*—Seed, Berry & Dowrey

ABSTRACT: A seating platform is made of forward, intermediate and rear sections suitably hinged so that the sections may be folded with the undersides of the forward and rear sections facing one another. Two bunker plates are fixed to the sections and runners are detachably mounted on the lateral ends of the bunker plates. The detachable mounting means for the runners include mating slots and tongues with flexible pins locking the tongues in the slots. The sections are held in the seating position by mating cams and grooves between the intermediate and forward and rear sections and are locked in place by L-shaped bars slidably received in brackets mounted on the underside of the intermediate section. Pontoons suitable for water-skiing or snow skis may be detachably mounted on the runners. When folded the sections form a carrying case in which the detachable runners may be carried. A bobsled runner is provided with a replaceable shoe mounted in apertures in the runner.

INVENTOR
I. R. JACOBSON

BY

ATTORNEYS

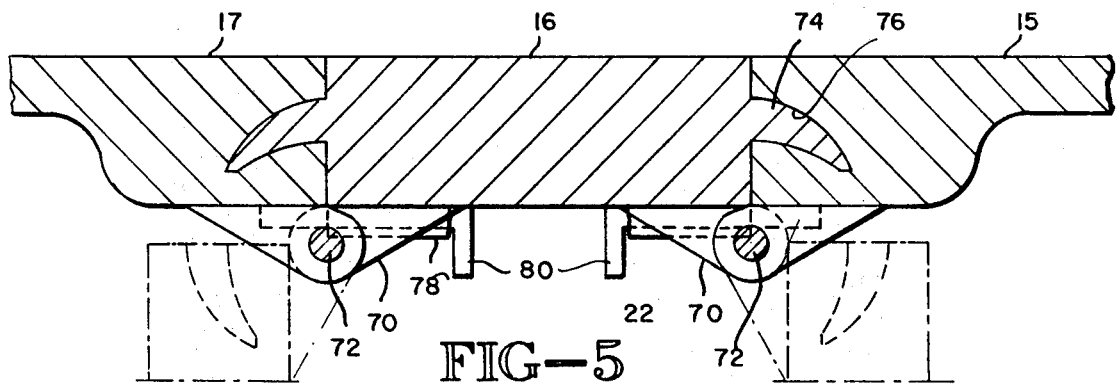
FIG-5
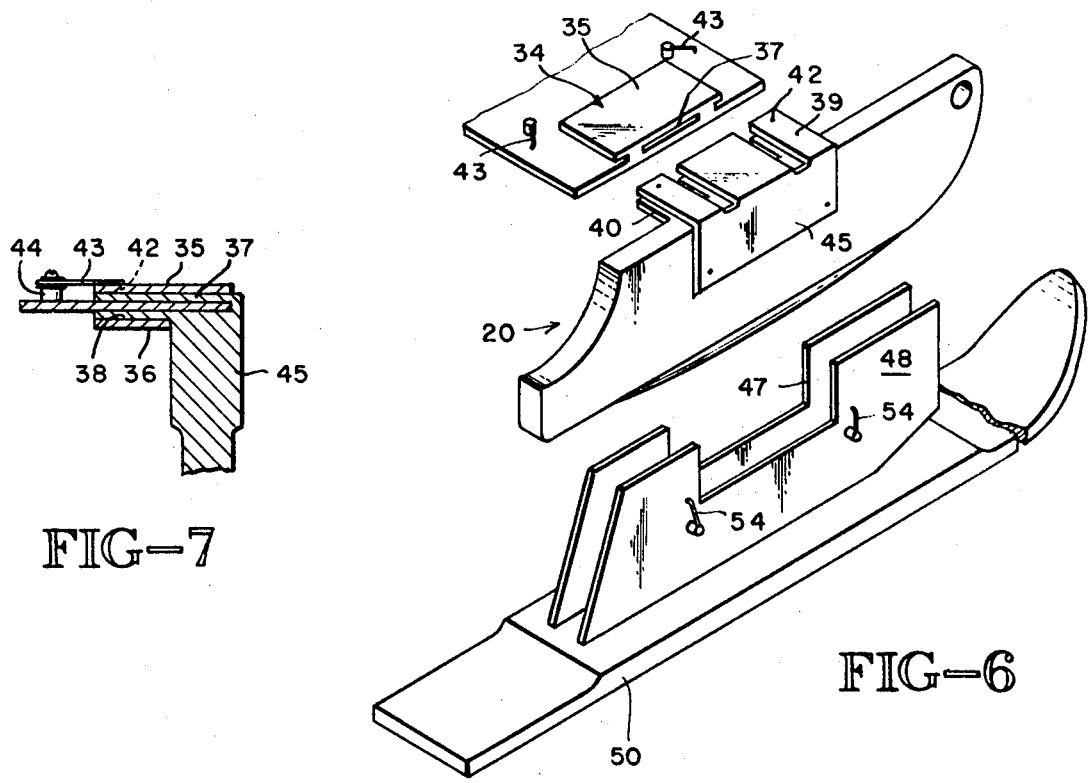
FIG-7
FIG-6

INVENTOR
I. R. JACOBSON

BY Seed, Berry & Dowrey

ATTORNEYS

COLLAPSIBLE BOBSLED

BACKGROUND OF THE INVENTION

1. Field of the Invention

This invention pertains to collapsible sleds or the like and to improved forms of components usable on such sleds.

2. Description of the Prior Art

Collapsible sleds have been known heretofore; however, such sleds have been expensive to manufacture due to the need for complicated hardware allowing for collapsibility or, where simple connecting hardware is employed, it has often not been adequate to provide a stable, safe-riding sled. In addition, sleds heretofore known have not been collapsible into compact cases and have been folded top-to-top leaving the runners protruding from the case.

Another problem in prior art collapsible sleds is that the detachable runners are often loose and unstable when in use and are difficult to detach or assemble. SUMMARY OF THE INVENTION This invention pertains to collapsible sleds, particularly bobsleds that may, in addition, be converted into snow or water-skiing sleds. A typical sled embodying the principles of the invention employs forward, intermediate and rear sections that are hinged to fold in such a manner that the undersides of the forward and rear sections are facing one another. Restraining means is provided that advantageously is easy to disengage but yet provides a safe, stable platform when in use. With the undersides of the sections facing one another when the sled is collapsed all of the appending structures of the sled are contained within the folded sections.

Another feature of the invention is the provision of means for connecting a sled runner to the sled and for converting the sled runner into a snow ski or water pontoon. The connecting means includes interfitting slots and tongues that are easy to assemble and detach but provide a stable, safe connection. The tongues extend laterally from the runners so that the sliding contact is in a direction transverse to the direction of travel of the runners when in use and thus a simple locking pin may be used to hold the runners in place.

Another feature is the provision of a shoe for a sled runner that may be easily replaced on site The shoe is inserted in apertures in the runner and requires no additional securing means for fastening it to the runner.

BRIEF DESCRIPTION OF THE DRAWINGS

FIG. 5 is a fragmentary section taken along the line 5-5 of FIG. 3.

FIG. 6 is an exploded isometric of a portion of the sled shown in FIG. 1 with a snow ski attachment therefore.

FIG. 7 is a fragmentary section taken along the line 7-7 of FIG. 4.

In FIG. 2 the sections are shown in the folded or collapsed position providing a case the sides of which are smooth. A detachable strap 24 is provided for carrying the sled and holding it in the collapsed condition.

Figure 1:
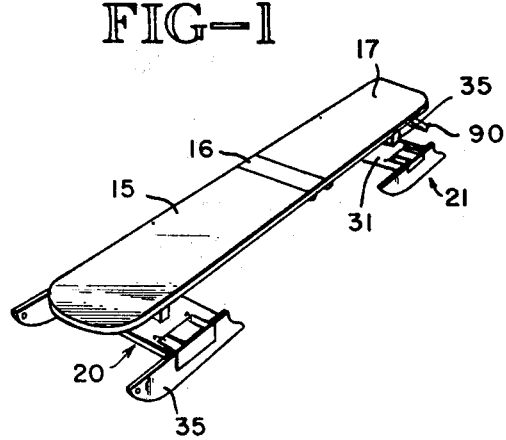
FIG. 1 is an isometric illustration of a bobsled embodying the principles of the invention.

The sections 15, 16 and 17 making up the seating platform may comprise any suitable structural material such as wood or plastic. The materials must be of sufficient strength, however, to support the weight of one or more persons with the seating-platform suspended between the forward and rear supporting means 20 and 21.

The forward supporting means 20 includes a bunker 27 secured to the underside of the forward section 15 as by bolting or the like and a movable bunker plate 28. A pivot bolt 26 extends through the forward section, bunker, and bunker plate.

The rear supporting means 21 includes a bunker 30, and bunker plate 31 bolted to the rear section 17. The bunkers and bunker plates of both the forward and rear supporting means are wood; however, plastic, aluminum, or other suitable material may be used.

Each lateral end of the bunker plates 28 and 31 is provided with connecting means 34 (FIG. 6) for releasably securing a detachable runner 35 to the bunker plate. The connecting means 34 is identical for each bunker plate therefore only one will be described and includes upper and lower integral guides 35 and 36 which provide a plurality of upper and lower sets of spaced central and end slots 37 and 38, respectively. In the preferred form of the invention the guides are molded on the end of the bunker plate; however, the guides could also be fabricated separately and bolted or otherwise secured to the bunker plate.

Each detachable bunker plate 35 is preferably formed of aluminum and includes upper and lower sets 39 and 40 of three spaced tongues. Each set of tongues fits within a respective set of slots 37 and 38 of the guides. Holes 42 are provided in the outermost tongues and are engageable by locking pins 43 suitably mounted on posts 44 secured to the bunker plate. As is readily apparent the sliding contact between the tongues and the slots is transverse to the direction of movement of a runner when in use. This feature allows the guides 35 and 36 to absorb the shock and loading so that the lightweight locking pins may be used to secure the runners to the bunker plate. The tongues are joined to the runners at laterally extending bosses 45 which serve as guiding surfaces for cutout portions 47 of upstanding plates 48. The plates 48 are secured to a snow ski 50. The outside boss is provided with holes 62 in which suitable locking pins 54 may be received for locking the ski 50 onto the runner. When the sled is converted into a snow-skiing vehicle the skis 50 are applied over the runners.

Figure 11:
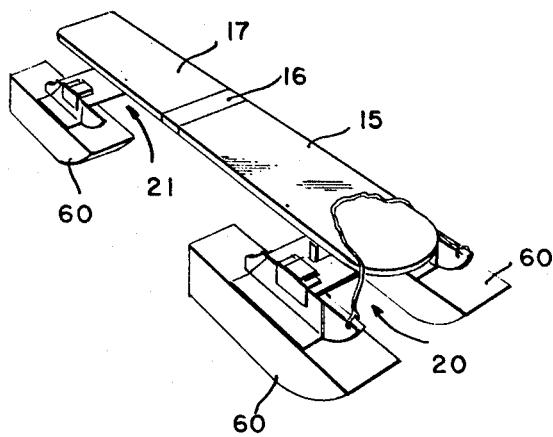
FIG. 11 is an isometric of the bobsled converted into a water-skiing craft. DESCRIPTION OF THE PREFERRED EMBODIMENTS In general, the collapsible sled includes forward, intermediate and rear sections 15, 16 and 17, respectively. The sled is supported by forward and rear supporting means 20 and 21, respectively. Restraining means 22 (FIG. 5) provides a stable connection when the sections are in the seating-platform position of FIG. 1.

FIG. 11 shows the sled having water-skiing pontoons 60 secured over the runners it being understood that the means for mounting the pontoon 60 onto a runner is identical with that for the snow ski 50 shown in FIG. 6.

Figure 2:
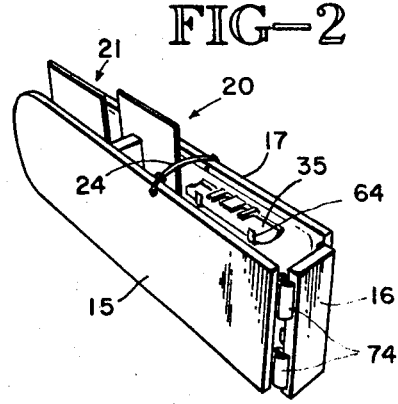
FIG. 2 is an isometric of the bobsled shown in FIG. 1 with the sections folded into a carrying case.
Figure 3:
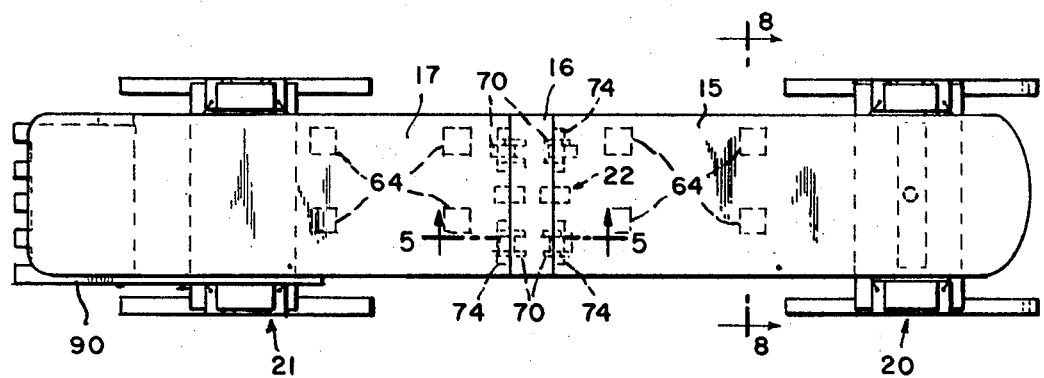
FIG. 3 is a plan view of the bobsled shown in FIG. 1.
Figure 10:
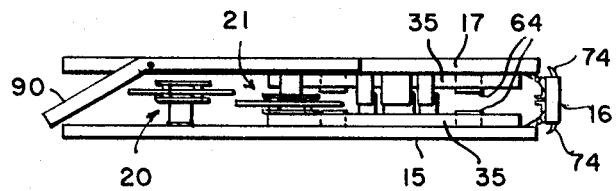
FIG. 10 is a plan of the sled folded into the position shown in FIG. 2.

Four sets of carrying clips 64 are provided on the underside of the forward and rear sections 16 and 17. As is best shown in FIGS. 2 and 10 the runners may rest on the clips 64 to be carried with the sled when it is folded into a case.

As best shown in FIG. 5 the forward and rear sections 15 and 17 are hinged to the intermediate section 16 by four sets of pivot arms 70 each of which is joined by a pivot bolt 72. The restraining means 22 for holding the sections in the seating-platform position includes two sets of transversely spaced, elongated cams 74 and grooves 76. The curvature of the cams and grooves is such as to allow smooth interdigitation. A pair of U-shaped brackets 78 are secured to the underside of the intermediate section 16 and each receives an L-shaped locking bar 80 which extends beyond the intermediate section into engagement with the underside of the respective forward section 15 or rear section 17. When engaged the L-shaped bar provides a positive lock to keep the sections in the seating-plateform position.

The runner 84 may be of aluminum, plastic or the like. The bottom of the runner is provided with an inverted L-shaped opening 86 which receives the forward end of a metallic shoe 88. Preferably the shoe is resilient and has an upwardly
} inclined rearward end that is nested in an upwardly inclined opening 88 in the rearward end of the runner 84. As is readily apparent the shoe may be replaced by snapping the rearward end out of the inclined opening 88 and thence twisting the forward end out of the opening 86.

Figure 4:
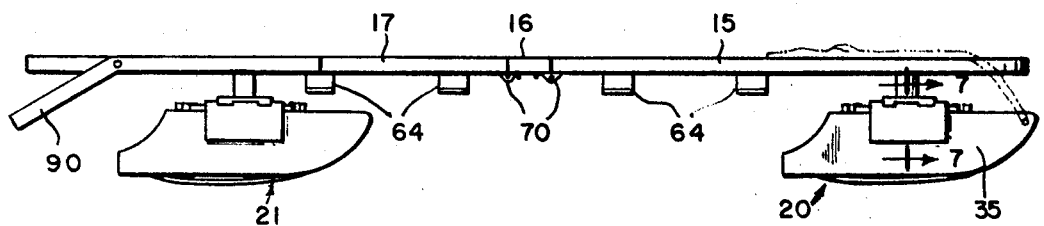
FIG. 4 is a side elevation thereof.
Figure 8:
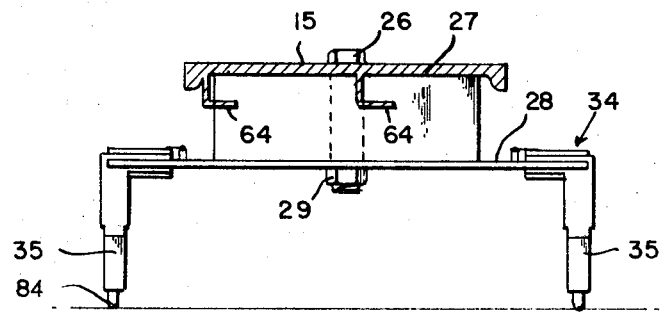
FIG. 8 is a section taken along the line 8-8 of FIG. 3.
Figure 9:
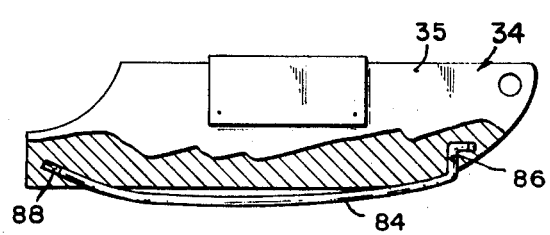
FIG. 9 is a side elevation of a typical detachable runner made according to the invention with parts broken away for clarity.

To open the sled into a seating-platform position the forward and rear sections are swung about the pivot bolts 72 until the cams 74 are fully inserted in the grooves 76. The L-shaped bars 80 are then slid through the brackets 78 to lock the sections in the open position. The runners are removed from the clips 64 and placed on the ends of the bunker plates. The sled is now ready for use. As is conventional, the rear section 17 is provided with a conventional brake 90 whereas the forward section may have a steering rope 92 shown in phantom lines in FIG. 4. To collapse the sled into a case the L-shaped bars are disengaged and the runners are removed and stored within the clips 64. The sections are then swung together and the carrying handle secured to the case.

While the preferred forms of my invention have been described it should be understood that changes may be made in the construction and arrangement of the parts without departing from the principles of my invention, and it is intended to cover by the following claims any modified forms of structure which may reasonably be included within their scope.

I claim:

1. A collapsible sled comprising: an elongated seating-platform including forward, rear and intermediate sections each having a seating surface for supporting a rider and all aligned in the same plane when said sections are extended for use; forward and rear platform supporting means secured to the undersides of said forward and rear sections; restraining means for holding said sections in extended, seating-platform positions, and first and second hinge means for securing said intermediate section to each of the forward and rear sections respectively for foldable movement of said forward and rear sections toward one another into a folded position with their undersides facing each other and wherein the separation of said first and second hinge means by said intermediate section provides a storage space between said forward and rear sections when in said folded position.

2. The sled defined by claim 1 wherein said restraining means includes L-shaped bars slidably mounted in brackets secured to said intermediate section.

3. The sled defined by claim 1 wherein said platform supporting means each include a set of detachable runners.

4. The sled defined by claim 3 wherein said platform supporting means each include a rectangular bunker plate, said runners being secured to the lateral ends of said bunker plates.

5. The sled defined by claim 3 further including pontoons secured to said detachable runners.

6. The sled defined by claim 3 further including snow skis having upstanding guides slidable over said runners and means for locking said skis on said runners.

7. A collapsible sled comprising: an elongated seating platform including forward, rear and intermediate sections; forward and rear platform supporting means secured to the undersides of said forward and rear sections; restraining means for holding said sections in extended, seating-platform positions, said restraining means including L-shaped bars slidably mounted in brackets secured to said intermediate section and interdigitating grooves and cams on said sections; and hinge means for securing said sections together for foldable movement of said forward and rear sections toward one another into a folded position with their undersides facing each other.

8. The sled defined by claim 7 wherein said platform supporting means each include a detachable runner and further including means on the undersides of said forward and rear sections for carrying said runners when detached.

9. A collapsible sled comprising: an elongated seating-platform including forward, rear and intermediate sections; forward and rear platform supporting means secured to the undersides of said forward and rear sections and each including a set of detachable runners, said forward and rear sections having runner clips secured to their undersides for carrying said runners when detached; restraining means for holding said sections in extended, seating-platform positions, and hinge means for securing said sections together for foldable movement of said forward and rear sections towards one another into a folded position with their undersides facing each other.